United States Patent [19]
Nishibe et al.

[11] Patent Number: 5,448,175
[45] Date of Patent: Sep. 5, 1995

[54] CURRENT DETECTING CIRCUIT

[75] Inventors: Yasushi Nishibe; Hitoshi Iwata, both of Niwa, Japan

[73] Assignee: Kabushiki Kaisha Tokai-Rika-Denki-Seisakusho, Aichi, Japan

[21] Appl. No.: 174,372

[22] Filed: Dec. 28, 1993

[30] Foreign Application Priority Data

Jan. 19, 1993 [JP] Japan .................... 5-6614

[51] Int. Cl.$^6$ ............................. G01R 27/26
[52] U.S. Cl. ........................ 324/546; 340/648
[58] Field of Search ............ 324/546, 158 NG, 713; 361/28; 340/648

[56] References Cited

U.S. PATENT DOCUMENTS

| | | | |
|---|---|---|---|
| 2,977,520 | 3/1961 | MacGregor | 361/28 |
| 3,332,007 | 7/1967 | Livengood et al. | 361/28 |
| 3,796,061 | 3/1974 | Weihl | 361/28 |
| 4,104,688 | 8/1978 | Pecsi | 361/28 |
| 5,222,009 | 7/1993 | Scharnick et al. | 361/28 |

FOREIGN PATENT DOCUMENTS 0245819 11/1987 European Pat. Off.
130939 12/1984 U.S.S.R. ................ 361/28

*Primary Examiner*—Maura K. Regan
*Attorney, Agent, or Firm*—Oliff & Berridge

[57] ABSTRACT

A current detecting circuit for detecting excess current. The current detecting circuit has a circuit which corresponds a reference value for detection with application of power to a load and temporarily makes the reference value for detection high. Faulty detection of rush current can be prevented without providing a timer circuit.

16 Claims, 3 Drawing Sheets

CURRENT DETECTING CIRCUIT

BACKGROUND OF THE INVENTION

1. Field of the Invention

The present invention relates to a current detecting circuit, and in particular, to a current detecting circuit which monitors current flowing in an inductance load, such as a motor, and which detects short circuits, overloads and the like so as to prevent faulty detection caused by rush current which flows when drive voltage is applied.

2. Related Art

In a circuit which controls an inductance load such as a motor or the like, when a current flowing in the load is monitored and a short circuit, an overload or the like is detected, excess current, i.e., rush current, during the application of drive voltage is temporarily flowing from the characteristic of the load. In order to prevent this excess current from being erroneously detected as an increase in current due to a load short circuit or an overload, it has been necessary to provide a separate circuit for effecting masking processing of the detection operation for a certain period of time immediately after the application of drive voltage.

In conventional current detecting circuits, usually a so-called timer circuit or the like is used as the circuit for effecting masking processing, and consequently, the cost of the structure has increased of necessity. Further, as the detection operation is not carried out during the time that masking processing is being effected by the timer circuit, there are limits to the speed at which detection can be carried out.

SUMMARY OF THE INVENTION

The present invention was developed in light of the above circumstances, and the object thereof is to provide an inexpensive current detecting circuit in which the faulty detection of an increase in an electric current value, which is caused by rush current flowing in an inductance load such as a motor immediately after application of power source voltage, as a short circuit or as overload can be prevented.

The current detecting circuit relating to the present invention includes a reference value output circuit which outputs a current detection reference value, and when a power source voltage is applied to an inductance load and simultaneously power is supplied, immediately after application of the power source voltage, the current detection reference value rapidly increases to a level which is higher than a level of normal rush current flowing in tile inductance load and then gradually decreases, and after a predetermined time has passed, the current detection reference value converges to a value which is higher, by a predetermined level, than a value of normal current flowing in the inductance load; and a comparator which compares a value of current flowing in the inductance load and the current detection reference value, and in a case in which the value of current flowing in the inductance load is greater than the current detection reference value, the comparator outputs an excess current detection signal.

When power is supplied to the inductance load and power source voltage is applied, simultaneously, power is supplied to the reference value output circuit. Immediately after the application of voltage, rush current flows in the inductance load, and the value of the current flowing in the load increases temporarily. If the rush current is within a range of normal rush currents, a current detection reference value, which rapidly increases to a level higher than the level of the rush current flowing in the load, is outputted from the reference value output circuit. As a result, even if the rush current and the current detection reference value are compared by the comparator, the comparator does not output an excess current detection signal. Accordingly, even if a separate circuit for effecting masking processing, such as a timer circuit, is not provided, and the current value increases due to rush current at the time that power source voltage is applied to the load, this increase is not mistakenly detected as a load short circuit or as an overload.

When the value of the current flowing in the inductance load becomes the normal current value after a certain time has passed from the application of power source voltage, the current detection reference value outputted from the reference value output circuit gradually falls from a level surpassing the rush current and converges at a value which is higher, by a predetermined level, than the normal current value. Current flowing in the load and the current detection reference value are compared by the comparator. Thereafter, if a current, which is a value surpassing the current detection reference value after the convergence of the current detection reference value as described above, flows in the inductance load, an excess current detection signal is outputted from the comparator.

On the other hand, if a load short circuit or the like has already occurred before the application of power source voltage, the comparator outputs an excess current detection signal at the point in time when the current flowing in the load exceeds the current detection reference value. Therefore, detection can be effected rapidly.

As described above, in accordance with the present invention, the current detection reference value rapidly increases to a level which is higher than a level of normal rush current flowing in the inductance load after application of power source voltage. Therefore, the temporary increase in the current value due to rush current is not erroneously detected as a load short circuit or as an overload. Further, there is no need to provide a separate circuit for effecting masking processing, such as a timer circuit or the like, in order to prevent faulty operation due to rush current. Therefore, the present invention provides a superior effect not found in conventional art in that, in the present invention, the circuit structure is simple and inexpensive.

DESCRIPTION OF THE PREFERRED EMBODIMENTS

An embodiment of the present invention will be described hereinafter on tile basis of FIG. 1 and FIG. 2.

Figure 1:
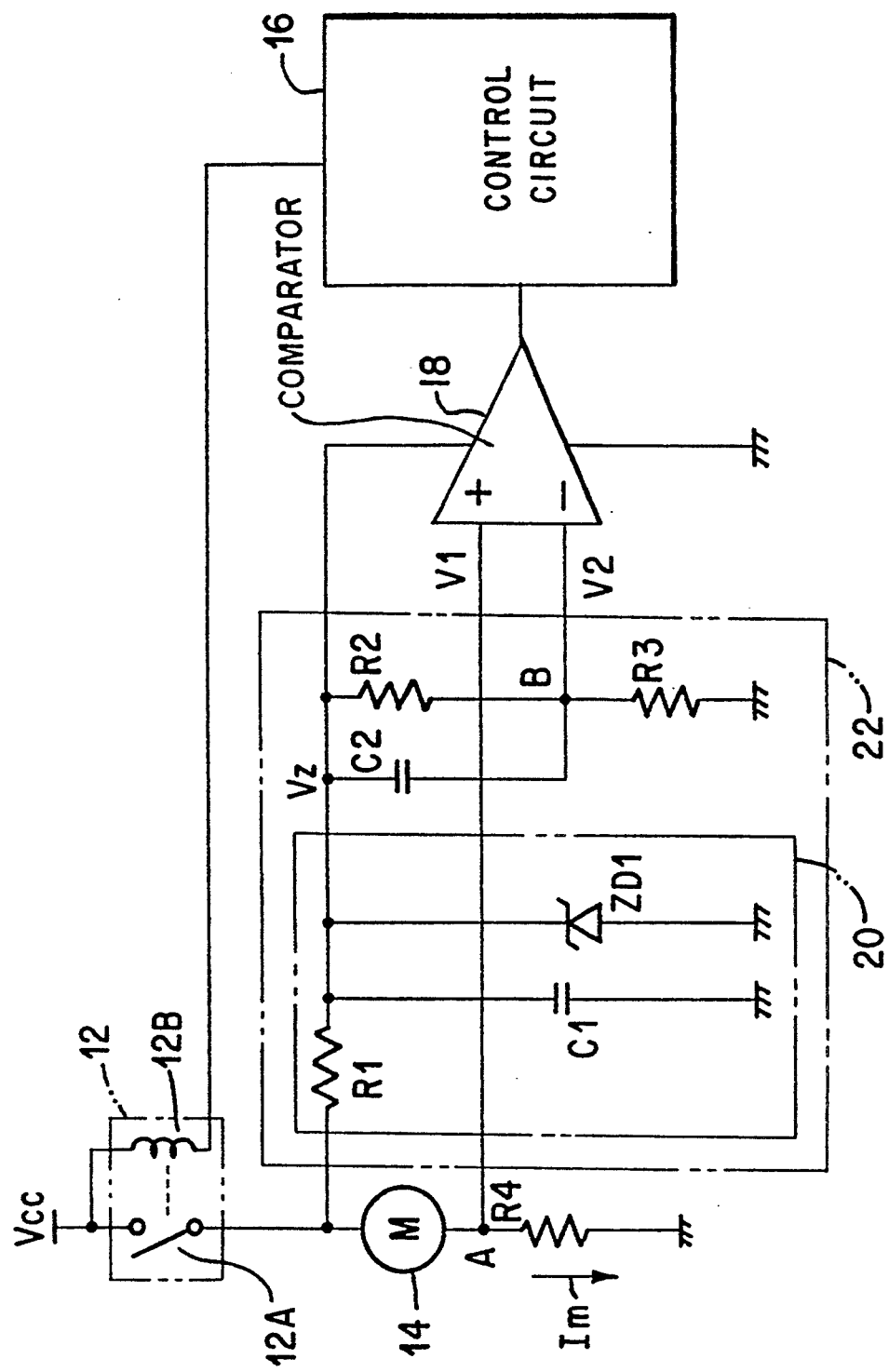
FIG. 1 is a circuit diagram illustrating an embodiment of the present invention.

A current detecting circuit relating to an embodiment of the present invention is illustrated in FIG. 1 together with a relay control circuit which drives a load.

As illustrated in FIG. 1, one end of a motor 14, which serves as an inductance load, is connected to a power source Vcc via a relay contact 12A of a relay 12. Another end of the motor 14 is grounded via a shunt resistor R4. When a motor current Im flows in the shunt resistor R4, an electric potential difference which is proportional to the motor current Im is generated between both ends of the shunt resistor R4. The shunt resistor R4 is provided so as to detect this electric potential as electric potential at point A in FIG. 1.

One end of a relay coil 12B is connected to the power source Vcc, and another end thereof is connected to a control circuit 16.

One end of a resistor R1 is connected to the power source Vcc via the relay contact 12A. Another end of the resistor R1 is grounded via resistors R2, R3. Further, a capacitor C1 and a Zener diode ZD1 are mutually connected in parallel between the other end of the resistor R1 and the ground. A type of constant voltage circuit 20 is formed by the resistor R1, the capacitor C1 and the Zener diode ZD1.

Point A on the high electric potential side of the shunt resistor R4 is connected to a non-inverted input end of a comparator 18. A connecting point B of the resistors R2, R3 is connected to the inverted input end of the comparator 18. A capacitor C2 is connected in parallel to the resistor R2 between the connecting point B and the other end of the resistor R1. In the present embodiment, a reference value output circuit 22 is formed by the resistors R2, R3, the capacitor C2, and the constant voltage circuit 20.

The comparator 18 compares the electric potential at point A, i.e., a voltage value V1 which is proportional to the motor current Im, and a detection reference electric potential V2. The detection reference electric potential V2 is an electric potential resulting from the electric potential at point B, i.e., the output voltage VZ of the constant voltage circuit 20 (which is determined by the Zener diode ZD1), being divided by the resistor R2 and the resistor R3. The comparator 18 outputs a high or a low output to the control circuit 16. In the present embodiment, the high level signal of the comparator 18 is an excess current detection signal. Although, on the surface, the comparator 18 compares the voltage V1 and the voltage V2, the comparator 18 substantially compares the motor current Im to a predetermined current detection reference value. In a similar manner, although the reference value output circuit 22 ostensibly outputs a detection reference electric potential, the reference value output circuit 22 actually outputs a current detection reference value which is a standard for detecting the motor current. Power from the constant voltage circuit 20 is supplied to the comparator 18.

Next, operation of the present embodiment will be described.

When the relay coil 12B is excited by a signal from the control circuit 16, the relay 12 is turned on and the power source voltage Vcc is applied to the motor 14 via the relay contact 12A. Immediately after the power source voltage Vcc is applied to the motor 14, rush current flows, and becomes a normal current thereafter. As a result, as shown in FIG. 2, the electric potential $V1(=R4 \times Im)$ at point A, which is proportional to the motor current Im, suddenly increases immediately after the power source voltage Vcc is applied, and thereafter, converges to a constant value.

The detection reference electric potential V2 is an electric potential which results from the division of the output voltage VZ from tile constant voltage circuit by the resistor R2 and the resistor R3. At the instant that the relay 12 is turned on, the power source voltage of the comparator 18 and the peripheral circuit thereof becomes VZ after a slight delay of a time constant $(R1 \times C1)$ which is determined by the resistor R1 and the capacitor C1. Further, after a delay by a time constant composed by the resistors R2, R3 and the capacitor C2, the detection reference electric potential V2 varies from VZ to $R3/(R2+R3) \times VZ$. Accordingly, the detection reference electric potential V2 fluctuates as illustrated in FIG. 2.

Figure 2:
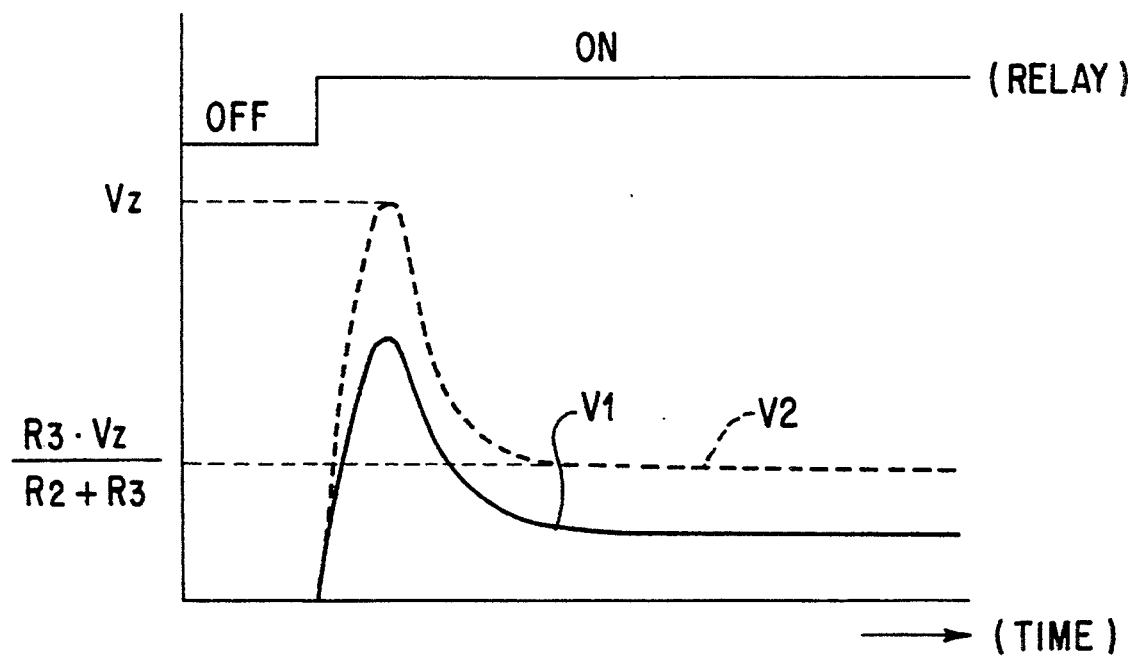
FIG. 2 is a line diagram explaining operation of FIG. 1.

V1 and V2 illustrated in FIG. 2 are compared by the comparator 18. When $V1 > V2$, a high output is output to the control circuit 16, and when $V1 < V2$, a low output is output to the control circuit 16.

The circuit power source which generates the reference electric potential V2 is used as a part of or as the entire power source of the comparator 18. Therefore, when power is not being supplied to the motor 14, i.e., when the relay 12 is off, the comparator 18 outputs a output, in the same way as during times of non-detection.

As described above, in accordance with the present embodiment, the detection reference electric potential V2 fluctuates (VZ changes to $R3/(R2+R3) \times VZ$) in the same way as the voltage value V1 which is proportional to the motor current Im (see FIG. 2). Therefore, there is no need to provide a separate circuit for masking processing, such as a timer circuit or the like, for preventing faulty operation caused by rush current. As a result, the circuit structure is simple and inexpensive.

Further, when there is a short circuit, overload or the like before the relay 12 is turned on, the detection reference electric potential V2 fluctuates similarly to the rush current as described above. Therefore, as compared to a case in which masking is effected by a conventional timer circuit, the circuit of the present invention can detect short circuits and the like even more rapidly.

Figure 3:
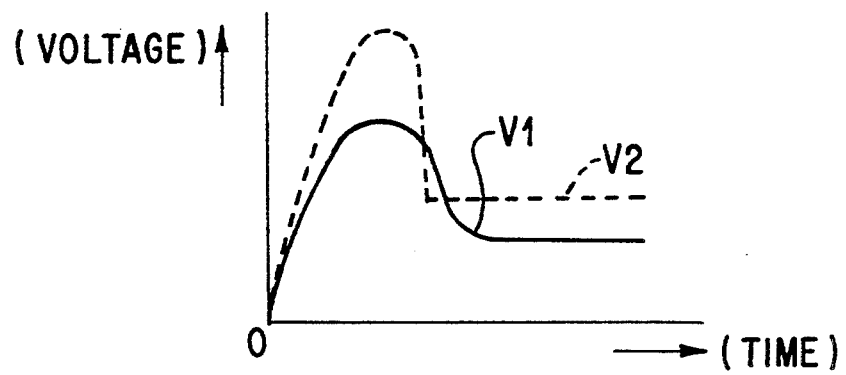
FIG. 3 is a line view explaining points which should be considered when a time constant of a detection reference value is selected.

By adjusting the circuit constants such as the resistances of the resistors R2, R3, the capacity of the capacitor C2, and the like, a time constant of the detection reference electric potential. V2 can be set which conforms to the fluctuations of the rush current in accordance with the magnitude of the load, the type of the load and the like. Therefore, the present invention has a wide range of applications and is quite convenient. When the time constant is set, as illustrated in FIG. 3, it is preferable that the rise of the detection reference electric potential V2 is not too rapid and that the waveform of the detection reference electric potential V2 does not fall beneath the waveform of the voltage value V1 which is proportional to the motor current value caused by the rush voltage.

Figure 4:
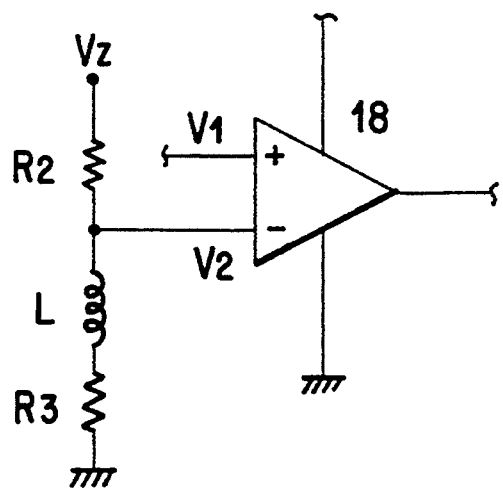
FIG. 4 is a circuit view illustrating main portions of a modified example of a reference value output circuit.
Figure 5:
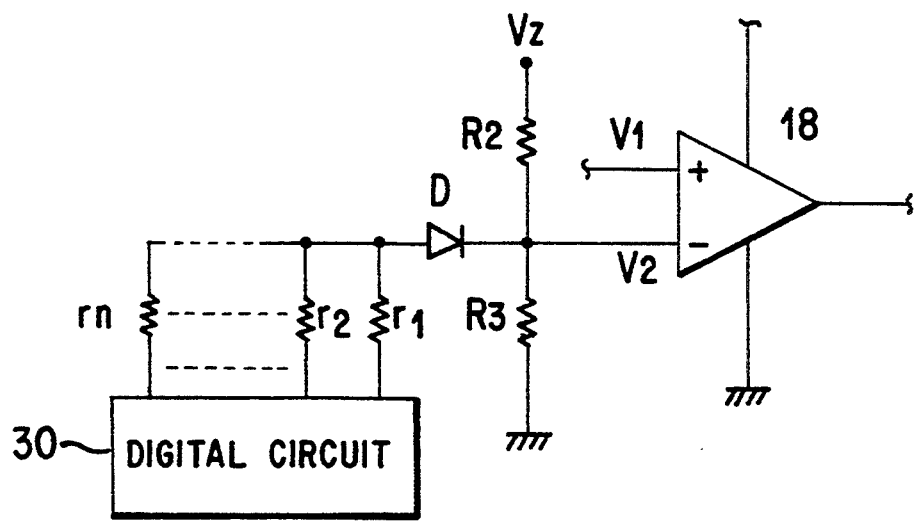
FIG. 5 is a circuit view illustrating main portions of another modified example of the reference value output circuit.

The above-described embodiment includes an example in which the reference value output circuit 22 is formed by the constant voltage circuit 20, the resistors R2, R3, and the capacitor C1. However, the present invention is not limited to the same. For example, as illustrated in FIG. 4, if a coil L is connected between the resistors R2, R3 instead of the capacitor C2, a circuit having the same function as that of the reference value output circuit 22 can be formed. Alternatively, as illustrated in FIG. 5, resistors r1, r2 . . . rn may be connected in parallel to the dividing point between the resistor R2 and the resistor R3 via a diode D for preventing reverse current. By using a digital circuit 30 such as a microcomputer or the like, the reference voltage (inverse input) of the comparator 18 can be made to fluctuate in the same way as it is made to fluctuate by the reference value output circuit 22. Further, although unillustrated, a microcomputer can be connected to the dividing point between the resistor R2 and the resistor R3 via a D/A converter and a diode for preventing reverse current, and the reference voltage (inverse input) of the comparator 18 can be made to fluctuate by microcomputer control in the same way as the reference voltage is fluctuated by the reference value output circuit 22.

The structure of the circuit which is the circuit power source of the comparator 18 and its peripheral circuit are not limited to a structure such as the constant voltage circuit 20 described above. In the constant voltage circuit 20, a resistor, a shunt regulator circuit, a series pass regulator circuit or the like may be used instead of the Zener diode ZD1.

Although in the above-described embodiment, the motor serve as an inductance load, the present invention is not limited to the same.

What is claimed is:

1. A current detecting circuit for detecting excess current flowing in a load after applying a power source voltage to the load, a normal rush current flowing in the load after a predetermined time from application of the power source voltage to the load, the current detecting circuit comprising:
    a reference value output circuit controllably varying a current detection reference value until the current reference value converges to a normal reference value by the predetermined time from the application of the power source voltage, the reference value output circuit controllably increasing the current detection reference value, after the application of said power source voltage to said load, to a value greater than a value of said normal rush current in said load, the reference value output circuit further controllably decreasing the reference value to the normal reference value by the predetermined time from the application of the power source voltage, said normal reference value being a predetermined amount greater than the value of the normal rush current, said reference value output circuit outputting a signal indicative of the current detection reference value; and
    a comparator outputting an excess current detection signal based on a comparison of current flowing in said load with the signal indicative of said current detection reference value output by said reference value output circuit.

2. A current detecting circuit according to claim 1, wherein said reference value output circuit maintains said current detection reference value at a value greater than a value of the current flowing in the load until said predetermined time.

3. A current detecting circuit according to claim 1, wherein said reference value output circuit comprises:
    a constant voltage circuit,
    at least two series resistors connected between said constant voltage circuit and ground, and
    a capacitative element connected between said constant voltage circuit and a dividing point between said at least two series resistors, wherein said current detection reference value is determined by voltage at said dividing point.

4. A current detecting circuit according to claim 1, wherein said reference value output circuit comprises:
    a constant voltage circuit,
    a first series resistor and a second series resistor connected with said first series resistor in series, and
    an inductive element connected in series with the at least two series resistors, the first series resistor connected between said constant voltage circuit and said inductive element, the second series resistor connected between the inductive element and ground, wherein said current detection reference value is determined by voltage at a dividing point between said first series resistor and said inductive element.

5. A current detecting circuit according to claim 1, wherein said reference value output circuit comprises:
    a constant voltage circuit,
    at least two series resistors connected between said constant voltage circuit and ground,
    a digital circuit, and
    a diode element connected between said digital circuit and a dividing point between said at least two series resistors, wherein said current detecting reference value is based on voltage at a dividing point between said series resistors.

6. A current detecting circuit of claim 3, wherein one input of said comparator is connected to said dividing point and another input of said comparator receives a signal indicative of the current flowing in the load.

7. A current detecting circuit of claim 4, wherein one input of said comparator is connected to said dividing point and another input of said comparator receives a signal indicative of the current flowing in the load.

8. A current detecting circuit of claim 5, wherein one input of said comparator is connected to said dividing point and another input of said comparator receives a signal indicative of the current flowing in the load.

9. A current detecting circuit for detecting excess current in a load after applying a power source voltage to the load, a normal rush current flowing in the load after a predetermined time from application of the power source voltage to the load, the current detecting circuit comprising:
    a reference value output circuit continuously varying a current detection reference value based on an amount of current flowing in the load from immediately after application of the power source voltage to the load until the current reference value converges on a normal reference value by the predetermined time from the application of the power source voltage, the normal reference value being a predetermined amount greater than a value of the normal rush current, said reference value output circuit outputting a signal indicative of the current detection reference value; and
    a comparator outputting an excess current detection signal based on a comparison of the current flowing in the load with the signal indicative of the current detection reference value output from the reference value output circuit.

10. A current detecting circuit according to claim 9, wherein said reference value output circuit maintains said current detection reference value at a value greater than a value of the current flowing in the load until said predetermined time.

11. A current detecting circuit according to claim 9, wherein said reference value output circuit comprises:
   a constant voltage circuit,
   at least two series resistors connected between said constant voltage circuit and ground, and
   a capacitative element connected between said constant voltage circuit and a dividing point between said at least two series resistors, wherein said current detection reference value is determined by voltage at said dividing point.

12. A current detecting circuit according to claim 9, wherein said reference value output circuit comprises:
   a constant voltage circuit,
   a first series resistor and a second series resistor connected with said first series resistor, and
   an inductive element connected in series with the at least two series resistors, the first series resistors connected between said constant voltage circuit and said inductive element, the second series resistor connected between the inductive element and ground, wherein said current detection reference value is determined by voltage at dividing point between said first series resistor and said inductive element.

13. A current detecting circuit according to claim 9, wherein said reference value output circuit comprises:
   a constant voltage circuit,
   at least two series resistors connected between said constant voltage circuit and ground,
   a digital circuit, and
   a diode element connected between said digital circuit and a dividing point between said at least two series resistors, wherein said current detecting reference value is based on voltage at a dividing point between said series resistors.

14. A current detecting circuit of claim 11, wherein one input of said comparator is connected to said dividing point and another input of said comparator receives a signal indicative of the current flowing in the load.

15. A current detecting circuit of claim 12, wherein on input of said comparator is connected to said dividing point and another input of said comparator receives a signal indicative of the current flowing in the load.

16. A current detecting circuit of claim 13, wherein one input of said comparator is connected to said dividing point and another input of said comparator receives a signal indicative of the current flowing in the load.

* * * * *